United States Patent
Thiel et al.

(10) Patent No.: US 12,134,139 B2
(45) Date of Patent: Nov. 5, 2024

(54) DEVICE FOR A LASER WORKING SYSTEM, LASER WORKING SYSTEM HAVING SAME, AND METHOD FOR SETTING A FOCAL POSITION OF AN OPTICAL ELEMENT

(71) Applicant: Precitec GmbH & Co. KG, Gaggenau (DE)

(72) Inventors: Marc Thiel, Baden-Baden (DE); Benjamin Lassoued, Karlsruhe (DE)

(73) Assignee: Precitec GmbH & Co. KG, Gaggenau (DE)

( * ) Notice: Subject to any disclaimer, the term of this patent is extended or adjusted under 35 U.S.C. 154(b) by 504 days.

(21) Appl. No.: 16/754,674

(22) PCT Filed: Oct. 2, 2018

(86) PCT No.: PCT/EP2018/076811
§ 371 (c)(1),
(2) Date: Apr. 8, 2020

(87) PCT Pub. No.: WO2019/072642
PCT Pub. Date: Apr. 18, 2019

(65) Prior Publication Data
US 2020/0353561 A1   Nov. 12, 2020

(30) Foreign Application Priority Data
Oct. 12, 2017   (DE) .......................... 102017009472.1

(51) Int. Cl.
*B23K 26/046*   (2014.01)
*B23K 26/06*   (2014.01)
(Continued)

(52) U.S. Cl.
CPC .......... *B23K 26/046* (2013.01); *B23K 26/064* (2015.10); *B23K 26/0648* (2013.01);
(Continued)

(58) Field of Classification Search
CPC .... B23K 26/046; B23K 26/064; G01K 1/026; G01K 7/02; G02B 7/028; H05B 3/84
See application file for complete search history.

(56) References Cited

U.S. PATENT DOCUMENTS 5,991,004 A    11/1999   Wallace et al.
6,198,579 B1   3/2001    Rupp
(Continued)

FOREIGN PATENT DOCUMENTS

EP   0965871 A1    12/1999
EP   1477853 A2    11/2004
(Continued)

OTHER PUBLICATIONS www.watlow.com/products/heaters/specialty-heaters/ultramic-ceramic-heaters website (Year: 2017).*
(Continued)

*Primary Examiner* — Janie M Loeppke
*Assistant Examiner* — Theodore J Evangelista
(74) *Attorney, Agent, or Firm* — DINSMORE & SHOHL LLP

(57) ABSTRACT

A device for a laser working system includes at least one optical element, which is arranged in a beam path of the device, and one temperature detector assembly having a matrix of detector elements. The temperature detector assembly is design to measure a two-dimensional temperature distribution of the optical element.

18 Claims, 8 Drawing Sheets

(51) Int. Cl.
| | |
|---|---|
| *B23K 26/064* | (2014.01) |
| *B23K 26/70* | (2014.01) |
| *G01K 1/02* | (2021.01) |
| *G01K 7/02* | (2021.01) |
| *G02B 7/02* | (2021.01) |
| *G02B 7/04* | (2021.01) |
| *G02F 1/29* | (2006.01) |
| *H05B 1/02* | (2006.01) |
| *H05B 3/16* | (2006.01) |
| *H05B 3/84* | (2006.01) |

(52) U.S. Cl.
CPC ............ *B23K 26/707* (2015.10); *G01K 1/026* (2013.01); *G01K 7/02* (2013.01); *G02B 7/028* (2013.01); *G02B 7/04* (2013.01); *G02F 1/29* (2013.01); *H05B 1/023* (2013.01); *H05B 3/16* (2013.01); *H05B 3/84* (2013.01); *H05B 2203/002* (2013.01)

(56) References Cited

U.S. PATENT DOCUMENTS

| | | | |
|---|---|---|---|
| 7,696,455 B2 * | 4/2010 | Lin | .................. H05B 3/283 |
| | | | 219/541 |
| 8,274,743 B2 | 9/2012 | Scaggs | |
| 9,289,850 B2 * | 3/2016 | Yamamoto | ........... B23K 26/046 |
| 2010/0201958 A1 | 8/2010 | Hauf et al. | |
| 2011/0080663 A1 * | 4/2011 | Arain | ...................... H01S 3/005 |
| | | | 359/896 |
| 2011/0249342 A1 | 10/2011 | Scaggs | |
| 2013/0230074 A1 | 9/2013 | Shin | |
| 2013/0235901 A1 * | 9/2013 | Shin | ......................... G01J 5/07 |
| | | | 374/121 |
| 2013/0341309 A1 * | 12/2013 | Yamamoto | ............. B23K 26/00 |
| | | | 219/121.61 |
| 2016/0046262 A1 * | 2/2016 | Van Straten | ............. H05B 3/06 |
| | | | 219/522 |

FOREIGN PATENT DOCUMENTS

| | | | |
|---|---|---|---|
| JP | H01122688 A | | 5/1989 |
| JP | 2000094173 A | | 4/2000 |
| JP | 2008197580 A | * 8/2008 | ......... G01N 21/0332 |
| KR | 20000005842 A | | 1/2000 |
| KR | 20130101567 A | | 9/2013 |
| WO | 2007128835 A1 | | 11/2007 |

OTHER PUBLICATIONS

Watlow/specialty heaters (Year: 2017).*
Minco, heater design guide, 2017 (Year: 2017).*
TPA81 website, robot-electronics.co.uk/htm/tpa81tech.htm, 2017 (Year: 2017).*
International Search Report dated Jan. 28, 2019; International Application No. PCT/EP2018/076811.

* cited by examiner

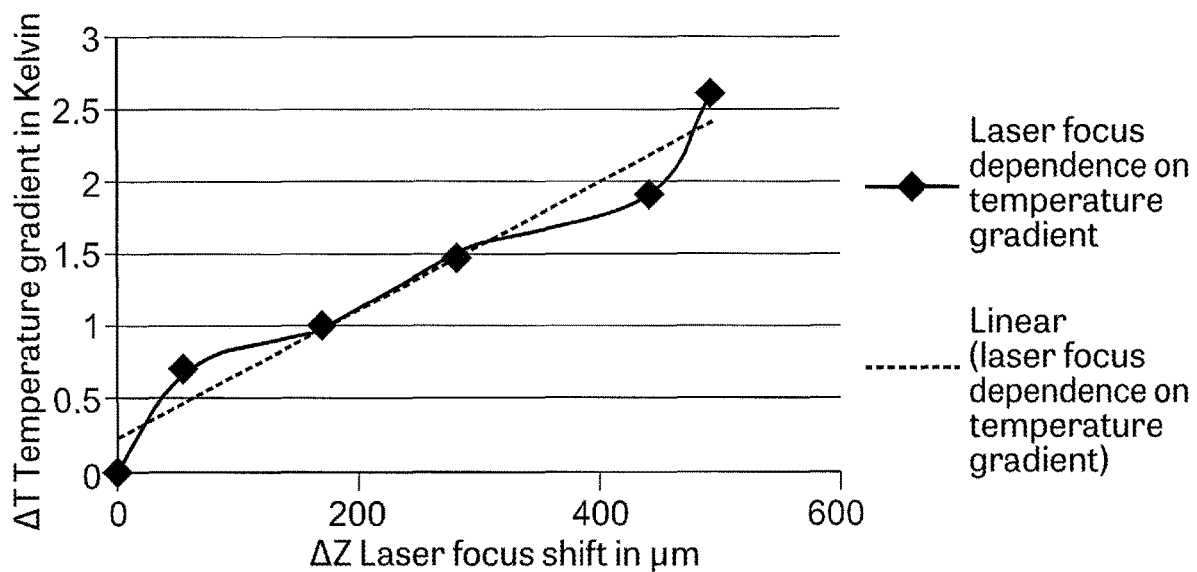
Fig. 8
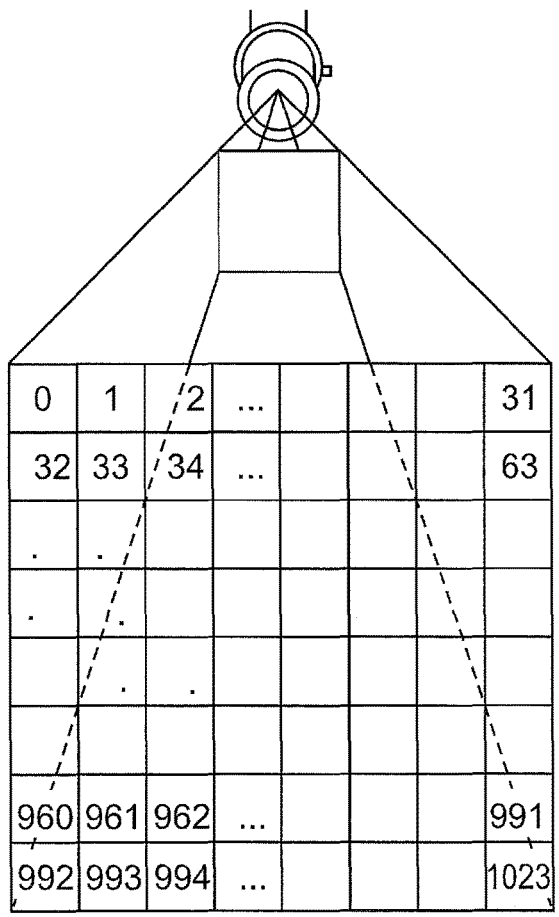 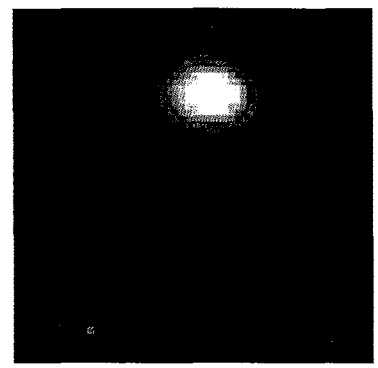
(a) Fig. 9 (b)

DEVICE FOR A LASER WORKING SYSTEM, LASER WORKING SYSTEM HAVING SAME, AND METHOD FOR SETTING A FOCAL POSITION OF AN OPTICAL ELEMENT

CROSS REFERENCE TO RELATED APPLICATIONS

This application is the U.S. national stage of PCT/EP2018/076811 filed Oct. 2, 2018, which claims priority of German Patent Application 102017009472.1 filed Oct. 12, 2017 both of which are hereby incorporated by reference in their entirety.

FIELD OF THE INVENTION

The present disclosure relates to a device for a laser machining system, a laser machining system therewith, in particular a system for machining of material by means of a laser beam, such as a laser machining head for laser cutting or laser welding, and a method of adjusting a focus position of an optical element. In particular, the present disclosure relates to the compensation for a thermal lens effect.

BACKGROUND OF THE INVENTION

In machining of material by means of a laser beam, such as laser welding or laser cutting, the laser beam exiting from a laser light source, for example the end of a laser optical fiber, is focused on the workpiece to be machined by means of a beam guiding and focusing optics. A laser machining head with a collimator optics and a focusing optics is normally used, the laser light being supplied via an optical fiber, also referred to as a laser source. In a device for machining material by means of a laser, e.g., in a laser machining head, the laser light passes through a variety of optical elements, such as lenses.

In optical elements, such as lenses and lens systems, for laser applications, local heating due to absorption of laser energy may occur. This absorption leads to a temperature gradient which locally changes the refractive index n(T) of the lens. The different refractive indices of the lens result in a shift of the laser focus. For example, depending on the lens material, a negative or positive focus shift may occur. This focus shift leads to a reduction in the machining quality in laser applications, such as in cutting processes.

In conventional applications, the lens can be cooled to dissipate heat from the center of the lens. However, this also creates a temperature gradient that shifts the focus. U.S. Pat. No. 8,274,743 B2 discloses the use of different lens materials within a lens system to compensate for the focus offset. However, such passive compensation is not suitable for all applications.

From U.S. Pat. No. 5,991,004 A it is further known to generate a light pattern, which is guided through the lens, by means of a grating. This light pattern is recorded by a CCD camera and registers shifts in the pattern. These shifts are used to correct the focus using optical techniques.

Other conventional approaches use temperature measurements. For example, in JP 2000094173 A, a lens temperature is measured with a thermocouple on the edge of the lens. In other words, the temperature rise averaged over the edge of the optical element is detected.

JP 01122688 A uses a "single thermopile" (thermocouple) to determine the temperature on the lens and a further thermocouple on the edge of the lens. In other words, the temperature is sensed at points on the surface and on the edge, that is, a one-dimensional measurement. A microcontroller evaluates the measurement data and moves the lens by motor.

SUMMARY OF THE INVENTION

It is an object of the present disclosure to provide a device for a laser machining system, a method for adjusting a focus position of an optical element, and a laser machining system, in particular a system for machining material by means of a laser beam, such as a laser machining head or a system for laser cutting or laser welding, which allow compensation for a thermally induced focus offset of an optical element with high precession.

This object is achieved by the subject matter described herein. Advantageous embodiments of the invention are also specified.

According to embodiments of the present disclosure, a device for a laser machining system is provided. The device comprises an optical element arranged in a beam path of the device and a temperature detector arrangement having a matrix of detector elements configured to measure a two-dimensional temperature distribution of the optical element for adjusting the focus position of the optical element. The optical element may be configured to focus and/or collimate a laser beam.

Preferably, the temperature detector arrangement is configured for a spatially resolved measurement of the temperature of the optical element.

Preferably, the temperature detector arrangement comprises at least one thermopile.

Preferably, the matrix of detector elements is at least a 2×2 matrix. In particular, a 4×4 matrix with 16 pixels may be used.

Preferably, the device further comprises at least one heating device arranged on the optical element in order to supply thermal energy to the optical element.

Preferably, the device comprises thermal insulation configured to thermally insulate the at least one heating device.

Preferably, the at least one heating device is arranged on an edge region of the optical element in order to supply the thermal energy to the edge region.

Preferably, the optical element has a thermally conductive coating.

Preferably, the at least one heating device includes a plurality of heating elements, and in particular the plurality of heating elements forms a heating ring consisting of several segments.

Preferably, the at least one heating device comprises a single heating ring.

Preferably, the at least one heating device comprises a base and a plurality of heat sources arranged on the base.

Preferably, the device further comprises a thermal coupling element for thermally coupling the heat sources to the optical element.

Preferably, the heat sources are electrical resistors.

Preferably, the device further comprises a holder for the optical element, the holder being arranged between the at least one heating device and the optical element and being configured to provide thermal contact between the optical element and the at least one heating device.

Preferably, the device further comprises a controller configured to control the at least one heating device such that the optical element has a predetermined temperature distribution.

Preferably, the predetermined temperature distribution is an essentially homogeneous temperature distribution.

Preferably, the controller is configured to adjust a focus of the optical element by supplying the thermal energy.

Preferably, the device comprises a drive device configured to adjust a position of the optical element.

Preferably, the device further comprises a controller for controlling the drive device to adjust the position of the optical element based on the measured temperature distribution.

Preferably, the controller controls the drive device to adjust a focus of the optical element, and in particular to maintain the focus of the optical element substantially constant.

Preferably, the optical element is at least one of a lens, a lens system, a focusing lens, a collimating lens, a diverging lens, a beam shaping lens, a protective glass, a beam splitter or the like.

Preferably, the optical element consists of or contains silicon and/or glass.

According to further embodiments of the present disclosure, a device for a laser machining system is provided. The device comprises an optical element arranged in a beam path of the device and at least one heating device arranged on the optical element in order to supply thermal energy to the optical element. The optical element may be configured to focus and/or collimate a laser beam.

According to further embodiments of the present disclosure, a device for a laser machining system is provided. The device comprises an optical element arranged in a beam path of the device, a temperature detector arrangement having a matrix of detector elements configured to measure a two-dimensional temperature distribution of the optical element, and a drive device configured to adjust a position of the optical element. The optical element may be configured to focus and/or collimate a laser beam.

According to further embodiments of the present disclosure, a laser machining system, such as a system for machining material by means of a laser beam or a laser machining head, in particular for laser cutting or for laser welding, is provided. The laser machining system or the laser machining head comprises a laser source for providing a laser beam and the device for a laser machining system according to the embodiments described herein, the optical element being arranged in a beam path of the laser machining system or the laser machining head. The laser machining system or the laser machining head may comprise a collimator optics configured to collimate a laser beam and a focusing optics configured to focus the laser beam onto a workpiece.

According to other embodiments, a method for adjusting a focus position of an optical element is provided. The method comprises measuring a two-dimensional temperature distribution of the optical element with a matrix of detector elements.

Preferably, the temperature distribution is measured in a spatially resolved manner for a surface of the optical element.

Preferably, the method comprises selectively heating the optical element in order to adjust the focus position.

Preferably, an edge region of the optical element is heated selectively.

Preferably, the method comprises providing a substantially homogeneous temperature distribution for the optical element by means of selective heating.

Preferably, the method comprises adjusting a position of the optical element based on the measured temperature distribution.

According to other embodiments, a method for adjusting a focus position of an optical element is provided. The method comprises selectively heating the optical element to adjust the focus position.

According to further embodiments, a method for adjusting a focus position of an optical element is provided. The method comprises measuring a two-dimensional temperature distribution of the optical element with a matrix of detector elements, and adjusting a position of the optical element based on the measured temperature distribution.

Preferred, optional embodiments and special aspects of the disclosure are apparent from the dependent claims, the drawings and the present description.

According to the invention, the focus position of the optical element, such as a focus lens, is adjusted. For this purpose, a two-dimensional temperature distribution of the optical element is measured and used to adjust the focus position. For example, a thermopile matrix may be used to create a two-dimensional "map" of the temperature distribution on a surface of the optical element, from which a temperature gradient can be determined. Such a spatially resolved measurement allows the focus position to be adjusted with high precision. According to an aspect, the optical element is actively heated in order to adjust the focus position based on the measured temperature. For example, the optical element can be heated such that the optical element has an essentially homogeneous temperature distribution. According to another aspect, a position of the optical element is adjusted based on the measured temperature distribution in order to adjust the focus position.

BRIEF DESCRIPTION OF THE DRAWINGS

Exemplary embodiments of the disclosure are shown in the figures and are described in more detail below. In the figures:

FIG. 8 is a graph showing an exemplary focus shift depending on a temperature gradient with a regression line, FIG. 9($a$) a is a representation of a pixel matrix and a temperature distribution recorded therewith, FIG. 9($b$) is an image by a 32×32 thermopile arrangement for detecting a local temperature increase.

DETAILED DESCRIPTION OF THE PREFERRED EMBODIMENT

Figure 1:
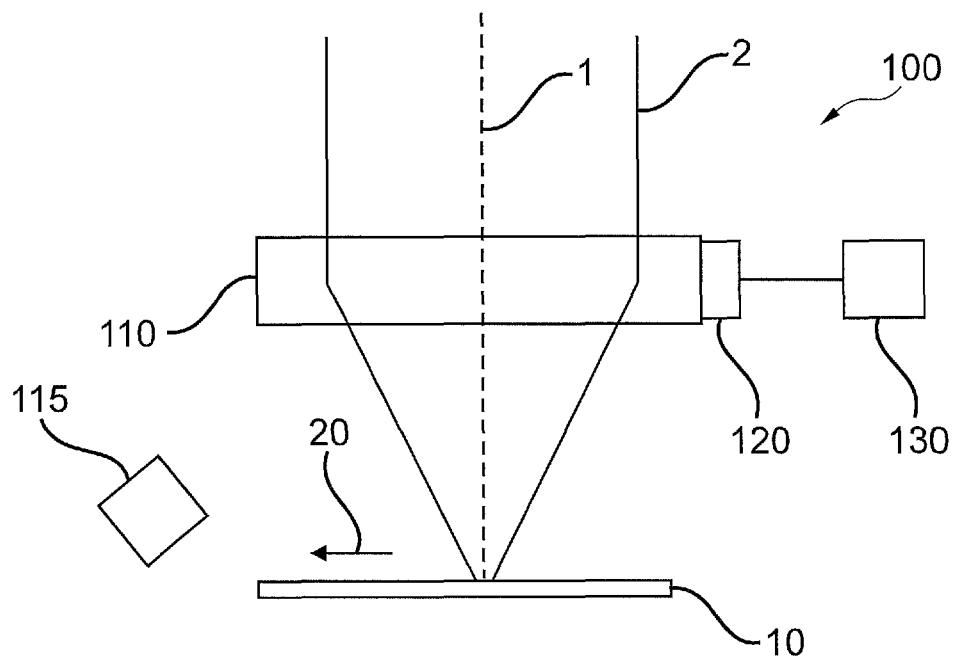
FIG. 1 is a schematic view of a device for a laser machining system according to embodiments of the present disclosure.

Unless otherwise stated, the same reference numerals are used for same and equivalent elements hereinafter.

FIG. 1 shows a device 100 for a laser machining system, and in particular a system for machining material by means of a laser beam, for example for laser cutting or laser welding, according to embodiments of the present disclosure. The device 100 can monitor a focus offset (also referred to as "focus shift") and compensate therefor by regulating the temperature. By absorbing a laser beam, the optical element 110 heats up primarily at the location of the laser passage, i.e., generally in the center.

The focus offset is generated by a local temperature increase in and/or on the optical element, leading to a different refractive index with respect to the edge of the optical element (Δn). This can be caused, for example, by a low thermal conductivity of the material of the optical element. The refractive index may be expressed by the following formula:

$$n(T) = n_0(\lambda) + \frac{dn_{abs}(\lambda, T)}{dT} \cdot \Delta T. \tag{1}$$

Instead of dissipating the heat via the edge of the lens, as is the case in some conventional systems, according to some embodiments of the present disclosure, heat is introduced, for example, into the edge of the optical element, and the optical element is thermally regulated. As a result, a temperature equilibrium between an inner region and an outer region of the optical element, in particular, can be set in order to adjust the focus position. In other embodiments, the position of the optical element can be adjusted, for example, along the z-axis in order to adjust the focus position.

As shown in FIG. 1, the device 100 comprises at least one optical element 110 configured to focus a laser beam 2, for example onto a workpiece 10, and a temperature detector arrangement 115 having a matrix of detector elements configured to measure a two-dimensional temperature distribution of the optical element. The temperature detector arrangement 115 may be configured for a spatially resolved measurement of the temperature distribution of the optical element 110. The temperature distribution may be an absolute temperature distribution or a relative temperature distribution. The absolute temperature distribution is based on a measurement of the absolute temperature, whereas the relative temperature distribution indicates a temperature difference, e.g. with respect to the edge temperature of the optical element 110. The temperature distribution may be a temperature distribution on a surface of the optical element 110, such as a temperature distribution on a first surface or a second surface opposite the first surface.

In particular, the optical element 110 may have the first surface, the second surface, and at least one side surface. The second surface may face the workpiece 10 and/or the first surface may be arranged opposite the second surface. The at least one side surface may connect edges of the first surface and the second surface. The at least one side surface may have a cylindrical shape.

The temperature detector arrangement typically comprises a thermopile or thermopile array (thermopile array). The temperature detector arrangement may be used to monitor the temperature of the optical element. With a thermopile array, it is possible to detect even individual small contaminations/defects at points of the optical element, which cannot be recognized with a standard temperature measurement. The temperature detector arrangement is described in more detail with reference to FIG. 9.

In some embodiments, the device 100 comprises at least one heating device 120 arranged on the optical element 110 in order to supply thermal energy to the optical element 110. A focus position of the optical element 110 can be adjusted by selective and/or local heating. In particular, the selective heating of, for example, an edge region of the optical element 110 may achieve a substantially homogeneous temperature distribution.

The optical element 110 may be a lens, such as a focusing lens. In the case of welding optics, spherical or aspherical focusing lenses are often used. According to the invention, the focus offset can be compensated for by local heating of the lens. A temperature gradient, which would arise, for example, if the lens were actively cooled, can be avoided.

The laser machining system can define an optical axis 1, the laser beam 2 propagating in relation to the optical axis. For example, the laser beam 2 may be substantially parallel or inclined to the optical axis 1. The laser machining system or parts thereof, such as a welding head, may be movable along a machining direction 20 according to embodiments. The machining direction 20 may be a cutting direction and/or a direction of movement of the laser machining system with respect to the workpiece 10. In particular, the machining direction 20 may be a horizontal direction. The machining direction 20 may also be referred to as "feed direction".

According to some embodiments, which can be combined with other embodiments described here, the at least one heating device 120 may be arranged at or on at least one of the first surface, the second surface and the at least one side surface. The first surface and the second surface may be convex or concave. In some embodiments, the first surface and the second surface may both have the same shape, for example convex or concave. In other embodiments, the first surface and the second surface may be different. For example, one surface may be convex and the other surface may be concave.

Typically, the at least one heating device 120 is arranged at or on an edge region of the optical element 110 in order to supply the thermal energy to the edge region. In the example of FIG. 1, at least one heating device 120 is arranged on the at least one side surface, which can be an edge or outer edge of the optical element 110.

In some embodiments, the optical element 110 has a thermally conductive coating. The thermally conductive coating may be used, for example, to improve the low thermal conductivity of quartz glasses or optics. For example, the thermally conductive coating may consist of sapphire. In some embodiments, a surface on which the at least one heating device 120 is arranged may be at least partially, and preferably completely, coated. Typically, the at least one side surface (e.g., the lens edge) may be provided with the thermally conductive coating. However, the present disclosure is not limited thereto. Edge regions of the first surface and/or the second surface may also be coated, for example when the at least one heating device is arranged on the first surface and/or the second surface (see FIG. 2).

For example, Corning 7980® (quartz glass) has a thermal conductivity of $$\lambda = 1.3 \frac{W}{m \cdot K}.$$

If the edge region under the heating elements is coated with sapphire $$\left(\lambda = 27.21 \frac{W}{m \cdot K}\right),$$

for example, a significant improvement in the heat supply into the optical element can be achieved. This allows for a more homogeneous temperature profile to be achieved and the focus offset to be reduced.

According to some embodiments, which can be combined with other embodiments described here, the device 100 comprises a controller 130 configured to control the at least one heating device 120 such that the optical element 110 has a predetermined temperature distribution. The predetermined temperature distribution may be a substantially homogeneous temperature distribution. The controller 130 is typically configured to adjust a focus of the optical element 110 by supplying the thermal energy. In particular, the thermally induced focus offset may be compensated for by locally supplying the thermal energy.

In typical embodiments, the edge region may be specifically regulated to a temperature measured, for example, in the center of the optical element 110 by means of the at least one heating device 120. The at least one heating device 120 may include a plurality of heating elements. Due to the large number of heating elements, an almost symmetrical/homogeneous heating of the optical element 110 may be ensured even in case of asymmetrical temperature distributions. For example, the temperatures achievable by the at least one heating device 120 are approximately 30 to 60° C. For example, with a laser power of 6000 W, a lens heats up to a maximum of 40° C. in the center.

Figure 2:
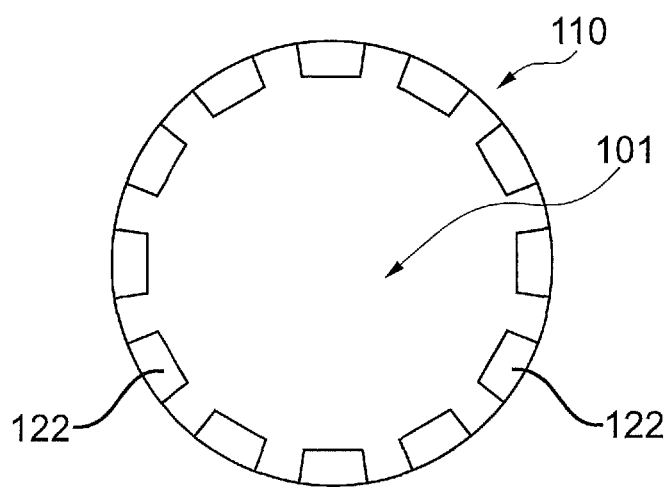
FIG. 2 is a schematic plan view of an optical element with a plurality of heating elements according to embodiments of the present disclosure, FIGS. 3A and B are drawings showing temperature distributions of the optical element of FIG. 2 according to embodiments of the present disclosure.
Figure 3A:
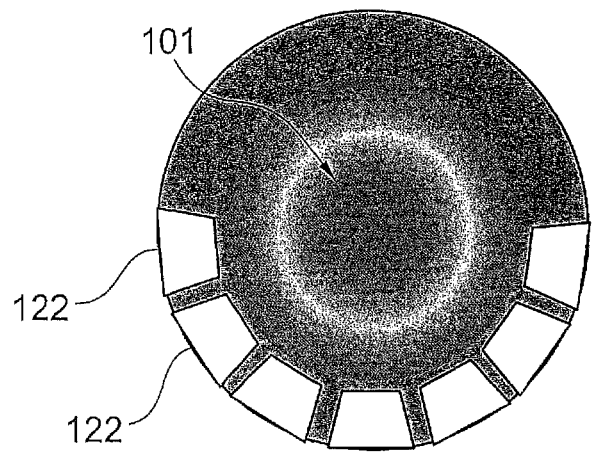

FIG. 2 shows a schematic top view of an optical element 110 according to embodiments of the present disclosure. FIGS. 3A and B show temperature distributions of the optical element of FIG. 2.

According to embodiments, which may be combined with other embodiments described here, the at least one heating device comprises a plurality of heating elements 122. The heating elements 122 may be arranged on the side surface of the optical element 110. Additionally or alternatively, the heating elements 122 may be arranged on the first surface and/or the second surface of the optical element 110, as is shown in the example of FIG. 2. The heating elements 122 may be arranged in an edge region of the first surface and/or the second surface, so that a center 101 of the optical element 110, through which the laser beam passes, is free or not obstructed.

Figure 4:
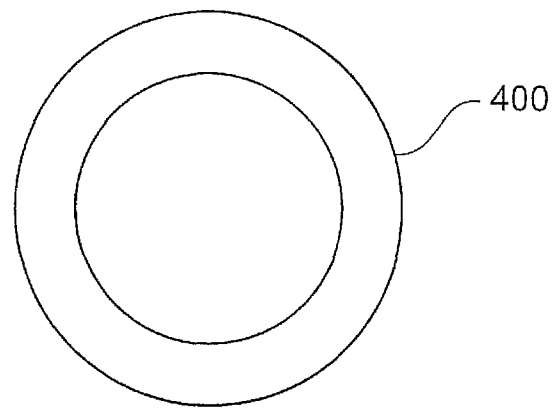
FIG. 4 is a schematic plan view of an optical element with a heating ring according to embodiments of the present disclosure.

In some embodiments, the heating elements 122 may form a heating ring consisting of several segments, i.e., the individual heating elements. FIG. 4 shows a schematic plan view of an alternative embodiment of an optical element with a continuous heating ring 400.

The controller may be configured to individually and/or selectively control the heating elements 122. For example, regulation can be performed by means of a voltage applied to the heating ring. The controller, which can be a microcontroller, may assume the temperature evaluation and regulation of the heating element or the heating elements. Based on the temperature of the optical element 110 or lens, e.g., in the center of the lens, recorded by means of the temperature detector arrangement, the controller may bring the optical element 110 or the lens to substantially equal temperature by means of the heating elements and thus bring the temperature closer to a homogeneous temperature distribution. This allows for the focus offset to be compensated for. In particular, the optical element may be heated to a homogeneous temperature completely in order to ensure a homogeneous refractive index of the optical element.

According to some embodiments, which can be combined with other embodiments described here, the device further comprises a thermal insulation configured to thermally insulate the at least one heating device. With the thermal insulation, the optical element may be protected against heat dissipation. The thermal insulation may prevent the individual heating elements from radiating too much energy into the surrounding housing and/or into the air, but instead specifically heat the optical element. This makes it possible to optimize the laser machining system in terms of energy efficiency.

In some embodiments, the at least one heating device comprises a base and a plurality of heat sources arranged on the base. The base may be a substrate or a board. Typically, the heat sources may be electrical resistors, such as low-resistance resistors. For example, low-resistance resistors serving as a heating source may be positioned on a board. The device, and in particular the at least one heating device, may also comprise a thermal coupling element (e.g., a thermal pad) for thermally coupling the heat sources to the optical element. Typically, the thermal coupling element comprises (or is) a rubber-like material, preferably with a high thermal conductivity.

Referring to FIGS. 3A and B, only half of the heating ring consisting of individual segments is shown for reasons of clarity. FIG. 3A shows a temperature distribution in which a center 101 of the lens is heated to a temperature $T_1$ by absorption, resulting in a focus offset. The heating elements 122 are selectively driven to compensate for the focus offset. For example, the edge region of the optical element may be heated to a temperature $T_2$. A homogeneous temperature is reached when $T_1=T_2$. The thermal lens may thus be regulated thermally.

Figure 3B:
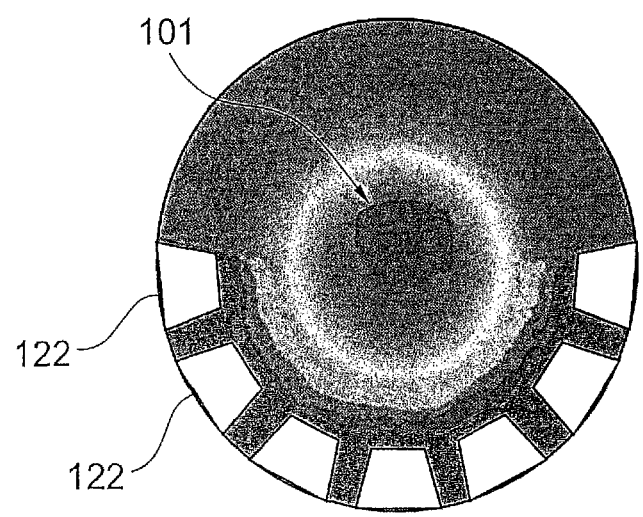

FIG. 3B shows an asymmetrical temperature distribution, e.g. due to a laser passing not exactly in the center or contamination. In this case, as shown in FIG. 3A, the heating elements 122 may be heated separately in order to regulate the lens to a homogeneous temperature, so that a temperature difference, for example between the center and the edge of the lens, is approximately zero ($T_1-T_2=\Delta T=0$).

Figure 5:
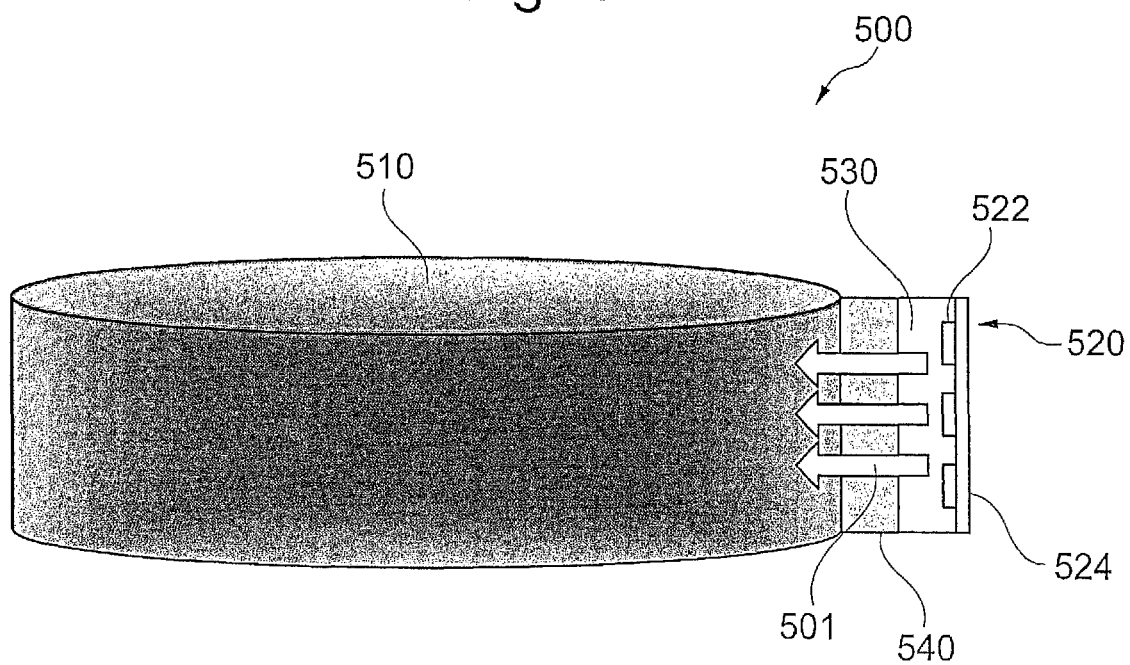
FIG. 5 is a schematic view of a device for a laser machining system according to further embodiments of the present disclosure.

FIG. 5 shows a schematic view of a device 500 for a laser machining system according to further embodiments of the present disclosure.

In this example, medium-resistance resistors 522 mounted on a board 524 serve as the heating source or as the heating device 520. The board 524 may also be used for outward thermal insulation towards the housing in order to increase the efficiency of the thermal regulation. In other words, the board 524 serves as the thermal insulation configured to thermally insulate the at least one heating device 520. Heat is supplied from the edge of the lens 510 to thermally compensate for the focus offset, as indicated by the arrows 501.

According to embodiments, the device 500, and in particular the at least one heating device 520, comprises the thermal coupling element 530 (e.g., a thermal pad) for thermally coupling the heat sources to the optical element 510. Typically, the thermal coupling element 530 comprises (or is) a rubber-like material, preferably with a high thermal conductivity.

According to some embodiments, which may be combined with other embodiments described herein, the device 500 comprises a holder 540 for the optical element 510, the holder being arranged between the at least one heating device 520 and the optical element 510 and being configured to a provide thermal contact between the optical element 510 and the at least one heating device 520. For this purpose, the holder may directly contact the optical element 510 mechanically.

The optical element 510, such as the lens, may be thermally contacted and regulated via the holder (its lens socket). This can be achieved, for example, by individually controlled low-resistance resistors. These resistors may be accommodated in a machining head and may thermally regulate the lens edge via the metallic lens socket. The board material on which the resistors are arranged may also serve as thermal insulation. Heating of individual segments of the lens may be controlled, ensuring thermal regulation even in case of an asymmetrical laser beam distribution.

Figure 6:
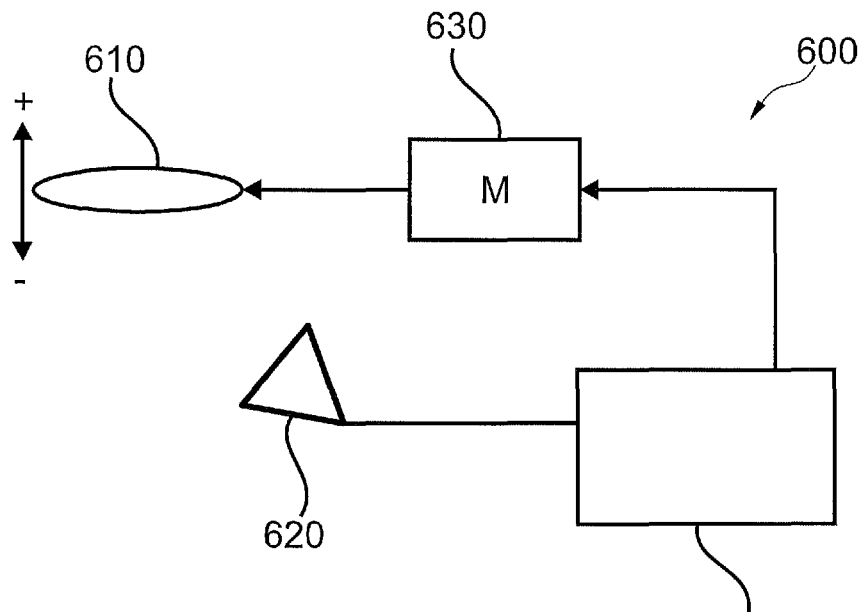
FIG. 6 is a schematic view of a device for a laser machining system according to other embodiments of the present disclosure.

FIG. 6 shows a schematic view of a device 600 for a laser machining system according to other embodiments of the present disclosure.

As already explained, the focus offset is generated by and based on a local temperature increase in and on the lens leading to a different refractive index ($\Delta n$). This temperature gradient changes the focus position depending on the lens material. According to the present disclosure, the temperature of the optical element is measured in a spatially resolved manner (e.g., in the x-y plane or a projection of the lens surface in the x-y plane), in order to record a temperature gradient of the optical element. A drive device, such as a motor, readjusts the optical element depending on the focus shift, e.g. in z-direction, e.g. along the optical axis. A controller, such as a microcontroller, may assume the temperature evaluation and regulation of the motor.

Referring to FIG. 6, the device 600 for a laser machining system comprises the optical element 610 configured to focus a laser beam, a temperature detector arrangement 620 configured to measure a two-dimensional temperature distribution of the optical element 610 with a matrix of detector elements, and optionally a drive device 630 configured to adjust a position of the optical element 610, for example along the z-axis. A controller 640 may be configured to evaluate the temperature and regulate the drive device 630. The temperature distribution is measured in a spatially resolved manner, for example for an entire surface of the optical element 610, such as the first surface or the second surface. In particular, the temperature distribution in the x-y plane may be measured. In case of a curved surface of the optical element 610, the temperature distribution may correspond to a projection of the curved surface in the x-y plane.

The controller 640 may control the drive device 630 to adjust a position of the optical element 610 based on the measured temperature distribution. For example, the position of the optical element 610 may be adjusted along the z-axis, which may be parallel to the optical axis. The focus of the optical element 610 may be adjusted by changing the position of the optical element 610. In particular, the controller 640 may control the drive device 630 to keep the focus of the optical element 610 substantially constant.

Figure 7:
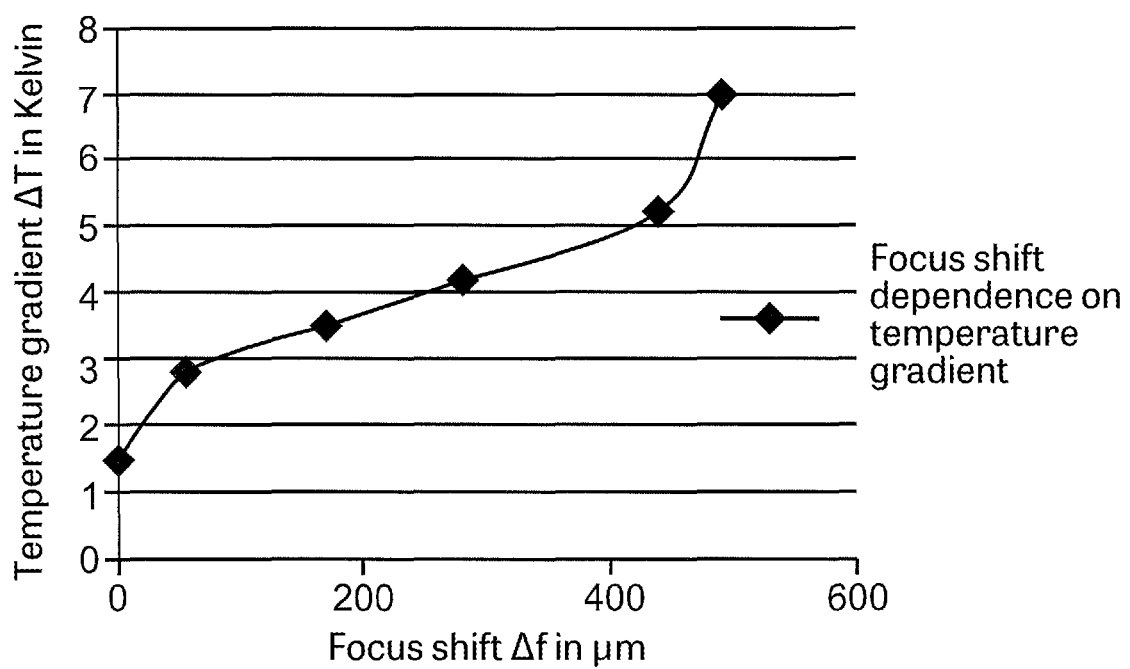
FIG. 7 is a graph showing an exemplary focus shift depending on a temperature gradient.

In FIG. 6, "+" and "−" indicate positive and negative focus shifts, respectively. An exemplary focus offset induced by temperature change is shown as a function of the temperature gradient in FIG. 7. Depending on the material and specific properties of the optical element, the structure according to the invention enables precise active compensation for the focus offset. Furthermore, the temperature detector arrangement 620 according to embodiments may detect (steep) individual temperature increases on the optical element 610 and may, as an early warning system, predict deterioration of the optical element 610.

According to typical embodiments, a linearity between the temperature gradient $\Delta T$ and the focus shift $\Delta f$ may be determined and subsequently compensated for. For this purpose, a thermopile arrangement (thermopile array) may be used as the temperature detector arrangement 620 monitoring the temperature gradient $\Delta T$ of the optical element 610, which is determined from the two-dimensional temperature distribution. The control device 630 may be controlled by means of the controller 640, the controller 640 readjusting the focus shift $\Delta f$ such that $\Delta f \sim 0$ in order to ensure precise compensation for the focus offset in laser applications.

FIG. 8 shows an exemplary focus shift depending on a temperature gradient with a regression line. Characteristic data may be recorded by means of a previous reference measurement of a specific optical system. FIG. 8 shows, for an example of a reference measurement with a clean lens, the dT-dz focus shift of the lens or a lens system with the corresponding regression line. In this way, a slope specific for the laser machining system, such as a laser machining head, and its optical system may be determined. Using software, the slopes determined from the regression line may be stored in a database, e.g. in the controller 640. Based thereon, a suitable adjustment by motor may be performed for each respective temperature gradient, for example in the form of a z-axis shift of the lens or of the optical element 110, in order to compensate for the focus offset.

FIG. 9(a) shows a temperature detector arrangement according to embodiments of the present disclosure. The temperature detector arrangement includes a matrix of detector elements (pixels). FIG. 9(b) shows an image by a 32×32 thermopile arrangement for detecting a local temperature increase.

According to some embodiments, which may be combined with other embodiments described herein, the temperature detector arrangement is a thermopile arrangement (thermopile array). The thermopile arrangement may measure the temperature of the optical element in a spatially resolved manner in order to record a temperature gradient of the optical element.

An exemplary thermopile arrangement may have at least a 2×2 matrix of detector elements. FIG. 9(a) shows a 32×32 matrix with a total resolution of 1024 pixels and an aperture angle of 90°×90°, providing a resolution of the exemplary optical element of approximately 350 pixels, as shown in FIG. 9(b). Alternatively, for example, a thermopile arrangement with an 8×8 matrix with an opening angle of 60°×60° and a resolution of 64 pixels may be used. The small dimensions of such a thermopile arrangement may easily be integrated in the smallest space. The maximum possible frame rate may be, for example, 60 Hz.

According to some embodiments, which can be combined with other embodiments described here, the optical element is made of silicon. The Si lens may be used to filter back reflections of the laser beam. This means that only the surface of the optical element may be recorded. In other words, the temperature distribution on the surface of the optical element, such as the entire first surface or second surface, may be determined.

In some embodiments, which may be combined with other embodiments described herein, the temperature detector arrangement may be configured to measure an absolute temperature distribution or a relative temperature distribution. The absolute temperature distribution is based on a measurement of the absolute temperature, whereas the relative temperature distribution indicates a temperature difference.

According to the invention, the temperature distribution of the optical element is measured in at least two spatial dimensions, i.e., two-dimensionally. According to embodiments, the term "two-dimensional" can be understood to mean that two or more spatially separated temperature measurement points (two or more pixels), for example in the center of the lens, are detected. For example, the temperature detector arrangement may have at least a 2×2 matrix of detector elements. A spatially resolved two-dimensional measurement differs from a one-dimensional measurement, in which only a single temperature measurement point (a single pixel), for example in the center of the lens, is recorded, as will be explained in more detail below with reference to FIG. 10.

Figure 10:
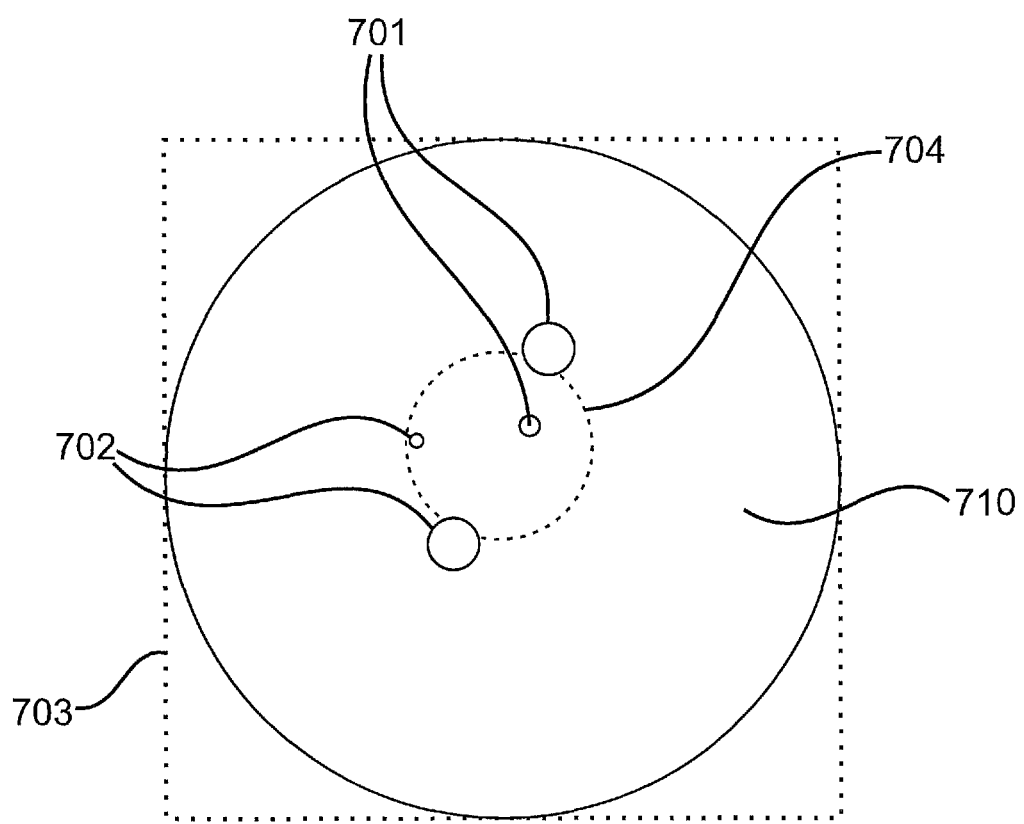
FIG. 10 is a schematic showing a comparison of the resolution and the accuracy of the temperature determination between a one-dimensional measurement and a two-dimensional measurement.

FIG. 10 shows a comparison of the resolution and accuracy of the temperature determination between a one-dimensional measurement (a single pixel) and a two-dimensional measurement according to the invention (two or more pixels).

FIG. 10 schematically shows hottest points 701 and cold points 702 on a lens 710. The hottest points 701 may be approximately 38° C. and the cold points 702 may be approximately 25° C. The spatially resolved measurement using the temperature detector arrangement according to the invention may precisely detect a grid of the highest temperatures by means of completely monitoring the lens 710 (reference numeral "703") and may obtain a real temperature gradient therefrom. The spatially resolved temperature measurement of the temperature detector arrangement according to the invention may optionally allow for detecting damage or dirt on the lens 710.

In contrast, a one-dimensional measurement detects an average of all values, for example of the center of the lens 710, as is indicated by the reference numeral "704". However, an asymmetrical temperature profile may vary widely, so that no real temperature gradient can be determined.

In particular, in a one-dimensional measurement as described in JP 01122688 A, a thermocouple at the edge of the lens and a thermopile monitoring the center of the lens may be used. This monitoring cannot detect any absorption effects caused by dirt on the lens. Only the average temperature increase of the complete lens can be detected. This means that it is not possible to tell exactly whether the average temperature is due to higher power, asymmetrical distribution of the laser beam or a defect or contamination of the lens surface. The thermopile arrangement of the present disclosure can easily differentiate therebetween by means of the 2D resolution of the complete lens, for example using appropriate software with a technical algorithm.

The one-dimensional measurement also has the disadvantage that, due to the distance and the opening angle of the 1D thermopile, it has a field of view (FoV) that is placed at a fixed and non-variable distance and angle exactly in the center of the lens. In other words, for respective monitoring in different laser machining heads, the sensor has to be elaborately configured at different distances and angles. This 1D thermopile records the fixed center of the lens and averages a temperature $T_1$ therefrom. If the monitoring diameter is increased, more low temperatures are recorded at the same time and the temperature in the center of the lens is distorted even more.

The thermopile arrangement of the present disclosure, on the other hand, may record the complete lens by means of the spatially resolved image and may record the average of the respective highest temperatures in the center of the lens even in case of an asymmetrical temperature profile. This advantage means that the thermopile arrangement can be used for all lens sizes, beam diameters and beam qualities with all laser machining heads in a customized manner.

Figure 11:
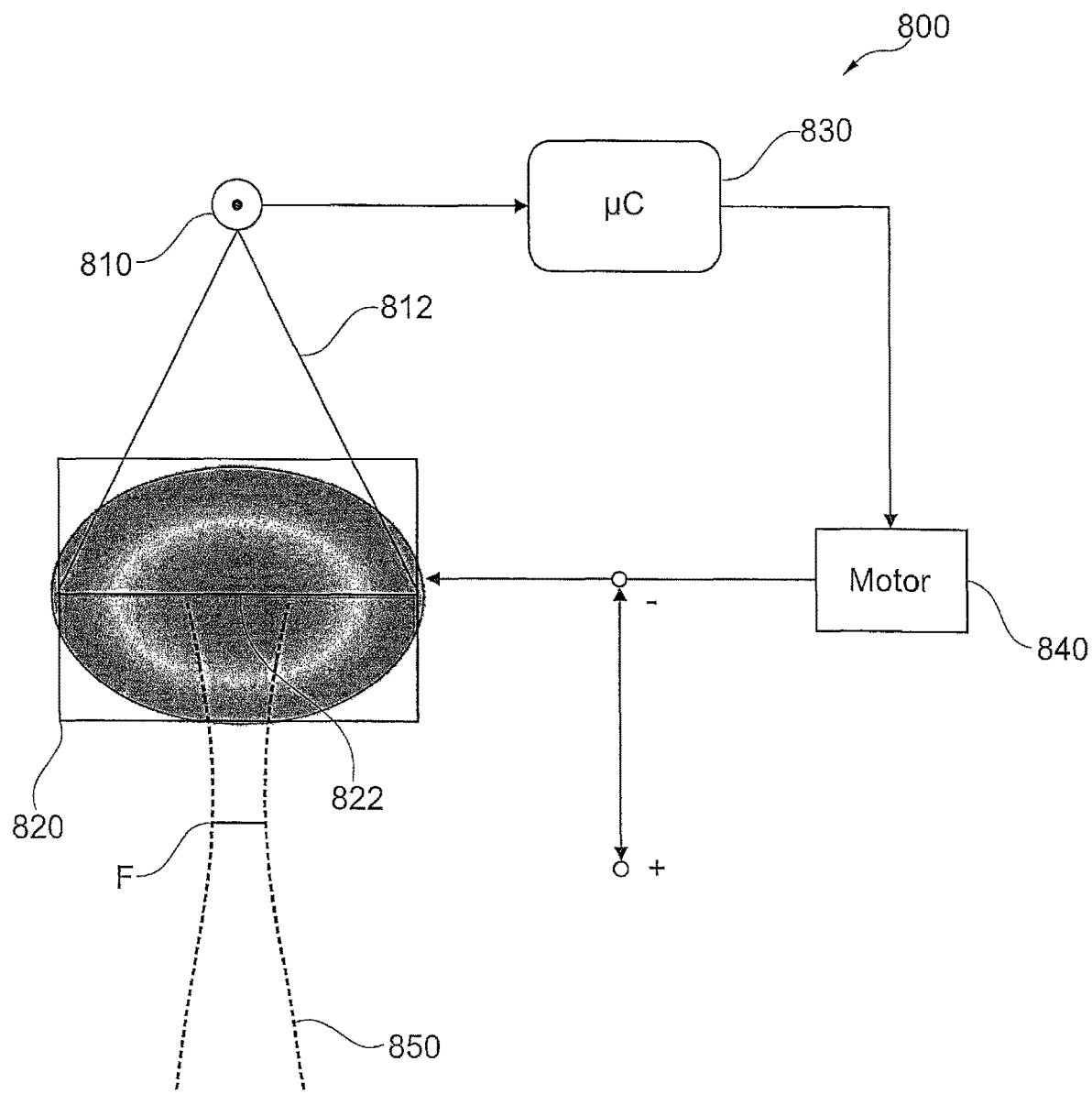
FIG. 11 is a schematic view of a device for a laser machining system according to further embodiments of the present disclosure.

FIG. 11 shows a schematic view of a device 800 for a laser machining system according to further embodiments of the present disclosure.

The device 800 includes a thermopile arrangement 810 with an opening angle 812, which records an image 820 of a temperature gradient ($\Delta T$) of the lens or the optical element 110. The image 820 is an image spanned in x-y direction, allowing for the entire lens to be recorded. Due to the high number of pixels, the temperature $T_1$ can be averaged in the center of the lens, regardless of the diameter of the laser beam. The thermopile arrangement 810 may arbitrarily determine the hottest points on the lens and thus form a precise temperature profile. The thermopile arrangement 810 may also average the cool spots on the lens edge as a reference value in order to determine a more precise temperature $T_2$ on the lens edge. The controller 830 evaluates the gradient and adjusts the position of the lens by motor in order to readjust the focus position F. In particular, a motor 840 may move the lens along a z displacement axis. Reference numeral 850 indicates the caustic of the laser beam.

According to embodiments, the slope m recorded in the reference measurements (see, e.g., FIG. 8) may be stored in the controller 830 for any optical systems. The focus shift $\Delta f=z$ shift may be recorded in the reference measurement by a beam diagnostic measuring device for the respective $\Delta T$ and then the slope may be determined:

The thermopile arrangement may evaluate the temperature gradient $\Delta T$ via the spatially resolved temperature measurement thereof. For example, the thermopile arrangement takes an average of the highest temperatures from the center of the lens to the edge:

$$\Delta T = T_1 - T_2$$

The z-shift can be expressed as follows:

$$z_{-shift} = (\Delta T + C)/m$$

C is an optional offset factor that can be added manually depending on the lens materials and measurement results. An advantage of the device according to the invention is that the thermopile arrangement is sufficient for compensation, since the stored slope m does not only include the focus offset of the focusing lens, but also includes information about the focus offset of the entire optical system.

Figure 12:
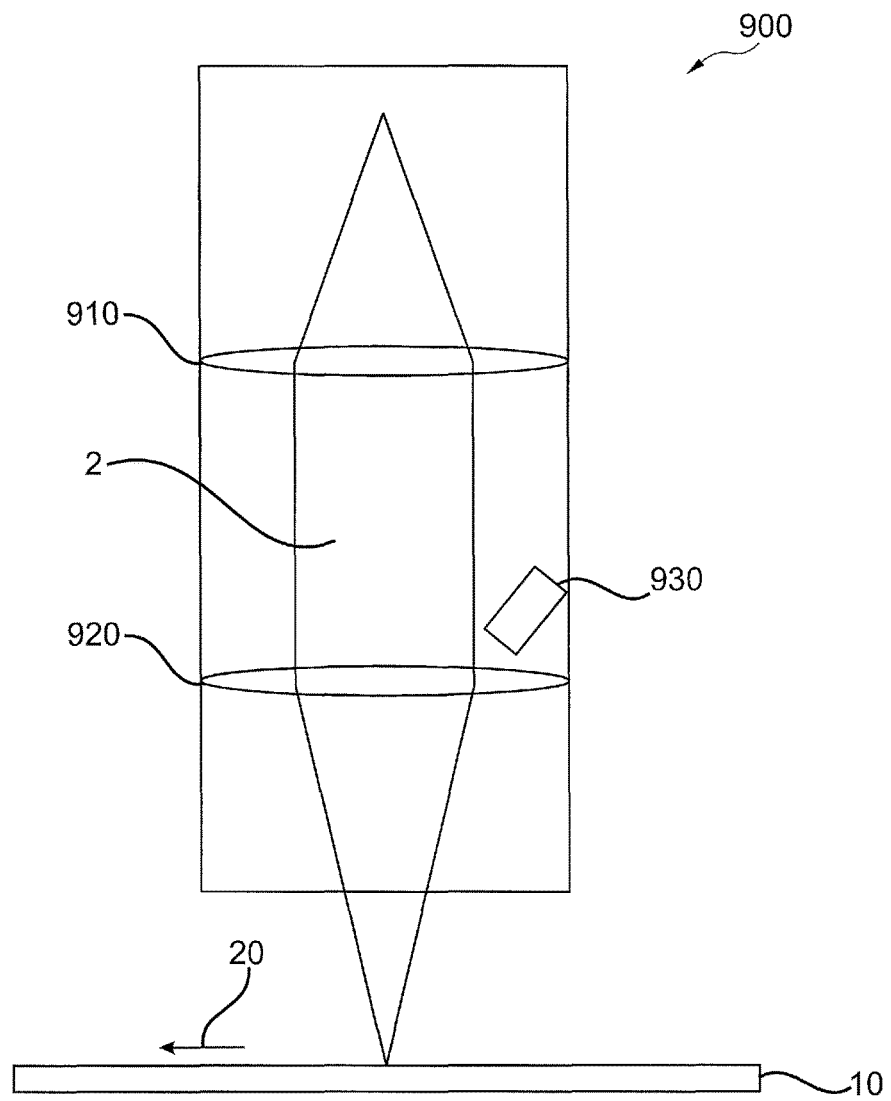
FIG. 12 is a schematic illustration of a laser machining system according to embodiments of the present disclosure.

FIG. 12 shows a schematic illustration of a laser machining system 900 according to embodiments of the present disclosure, such as a laser machining head.

The laser machining system or the laser machining head 900 comprises a laser source (not shown) for supplying a laser beam, such as an optical fiber or the like, a collimator optics 910 configured to collimate a laser beam 2, a focusing optics 920 configured to focus the laser beam 2 onto a workpiece 10, and the device for a laser machining system according to the embodiments described herein, the optical element being a focusing lens of the focusing optics 920. The temperature detector arrangement may be a thermopile arrangement 930 with a matrix of detector elements.

The laser machining system 900 comprises a laser device for generating the laser beam 2 (also referred to as a "machining beam" or "machining laser beam"). The laser machining system 900 or parts thereof, such as a welding head, may be movable along the machining direction 20 according to embodiments. The machining direction 20 may be a cutting direction and/or a direction of movement of the laser machining system 900, such as the welding head, with respect to the workpiece 10. In particular, the machining direction 20 may be a horizontal direction. The machining direction 20 may also be referred to as "feed direction".

By installing the thermopile arrangement at a corresponding angle in the housing of a machining head, a compressed image of the lens or a kind of elliptical image of the field of view is generated. This effect is further amplified by the curvature of a lens. Since this compressed image depends on the angle and distance of the thermopile arrangement, it can be improved by a geometrically improved placement of the sensor. Since the resolution of the thermopile arrangement can be very high, this effect has hardly any influence on the measurement accuracy and can be neglected. An additional improvement of this compression of the image can be achieved with a smaller field of view (FoV, opening angle) of the thermopile arrangement.

According to the invention, the focus position of the optical element, such as a focus lens, is adjusted. For this purpose, a two-dimensional temperature distribution of the optical element is measured and used to adjust the focus position. For example, a thermopile matrix may be used to create a two-dimensional "map" of the temperature distribution on a surface of the optical element, from which a temperature gradient can be determined. Such a spatially resolved measurement allows for the focus position to be adjusted with high precision. According to one aspect, the optical element is actively heated in order to adjust the focus position based on the measured temperature. For example, the optical element may be heated such that the optical element has a substantially homogeneous temperature distribution. According to another aspect, a position of the optical element is adjusted based on the measured temperature distribution in order to adjust the focus position.

The invention claimed is:

1. A laser machining head, comprising:
   a housing;
   an optical element arranged in a beam path of said laser machine head; and
   a temperature detector arrangement arranged in the housing inclined with respect to the beam path and having a thermopile matrix positioned at a distance from the optical element and configured to measure a spatially resolved two-dimensional temperature distribution of an entire surface of said optical element, wherein the matrix is at least a 2×2 matrix and wherein an opening angle of the temperature detector arrangement is at least 60°×60°,
   the spatially resolved two-dimensional temperature distribution including at least four spatially separated temperature measurement points, at least one of which being in a center of the optical element.

2. The laser machine head according to claim 1, further comprising:
   at least one heating device arranged on said optical element and separate from the temperature detector arrangement and operable to supply thermal energy to said optical element.

3. The laser machine head according to claim 2, wherein said at least one heating device is arranged on an edge region of said optical element in order to supply the thermal energy to the edge region.

4. The laser machine head according to claim 2, wherein said at least one heating device includes a plurality of heating elements, wherein said plurality of heating elements forms a heating ring consisting of at least two segments.

5. The laser machine head according to claim 2, wherein said at least one heating device comprises a single heating ring.

6. The laser machine head according to claim 2, wherein said at least one heating device comprises:
   a base; and
   a plurality of heat sources located on said base.

7. The laser machine head according to claim 6, wherein said heat sources are electrical resistors.

8. The laser machine head according to claim 2, further comprising a thermal coupling element thermally coupling said at least one heating device to said optical element.

9. The laser machine head according to claim 2, further comprising a holder for said optical element, said holder being arranged between said at least one heating device and said optical element and being configured to provide thermal contact between said optical element and said at least one heating device.

10. The laser machine head according to claim 2, further comprising a controller configured to control said at least one heating device such that said optical element has a predetermined temperature distribution.

11. The laser machine head according to claim 10, wherein said controller is configured to adjust a focus of said optical element by supplying thermal energy.

12. The laser machine head according to claim 1, further comprising a drive device configured to adjust a position of said optical element along an optical axis, and a controller for controlling said drive device to adjust a focus of said optical element by adjusting the position of said optical element based on the measured temperature distribution.

13. The laser machine head according to claim 1, wherein said optical element comprises at least one of a lens, a lens system, a focusing lens, a collimating lens, a diverging lens, a beam shaping optics, a protective glass and a beam splitter.

14. A method of adjusting a focus position of an optical element arranged in a beam path in a laser machining system wherein the laser machining system comprises a laser machining head including a housing, the method comprising:
   measuring a two-dimensional temperature distribution of an entire surface of said optical element with a temperature detector arrangement having a thermopile matrix with at least a 2x2matrix of detector elements positioned at a distance from the optical element and arranged in the housing inclined with respect to the beam path, an opening angle of the temperature detector being at least 60°×60°, the two-dimensional temperature distribution including at least four spatially separated temperature measurement points, at least one of which being in a center on the surface of the optical element.

15. The method according to claim 14, further comprising selectively heating an edge region of said optical element in order to adjust the focus position.

16. The method of claim 14, further comprising:
providing a substantially homogeneous temperature distribution for said optical element by selective heating.

17. The method according to claim 14, further comprising adjusting a position of said optical element along an optical axis based on the measured temperature distribution.

18. A device for a laser machining system, comprising:
an optical element arranged in a beam path of said device; and
a temperature detector arrangement having a thermopile matrix positioned at a distance from the optical element and configured to measure a spatially resolved two-dimensional temperature distribution of an entire surface of said optical element, wherein the matrix is at least a 2×2 matrix,
the spatially resolved two-dimensional temperature distribution including at least four spatially separated temperature measurement points, at least one of which being in a center of the optical element,
the device further comprising:
at least one heating device arranged on said optical element and separate from the temperature detector arrangement and operable to supply thermal energy to said optical element, and
a thermal coupling element thermally coupling said at least one heating device to said optical element, wherein the thermal coupling element comprises a rubber-like material.

* * * * *